Aug. 12, 1941.   C. B. MOORE   2,252,301
CONTROL SWITCH MEANS
Filed May 22, 1937   2 Sheets-Sheet 1
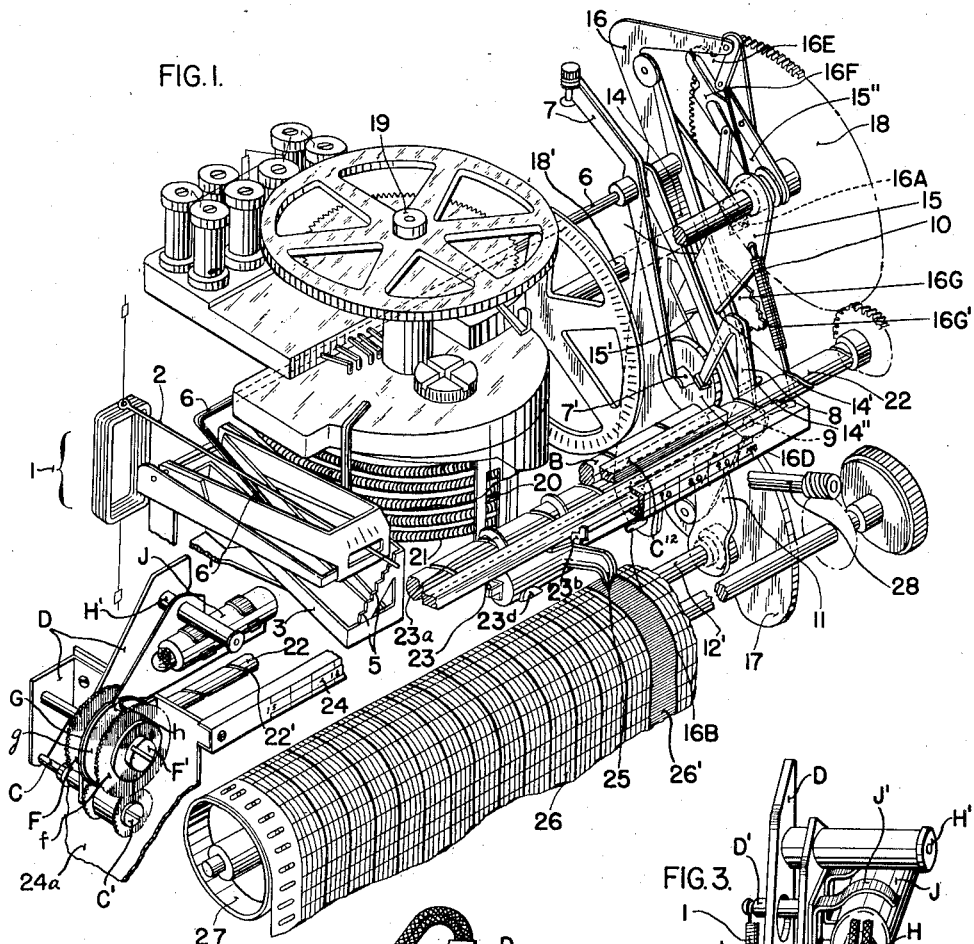
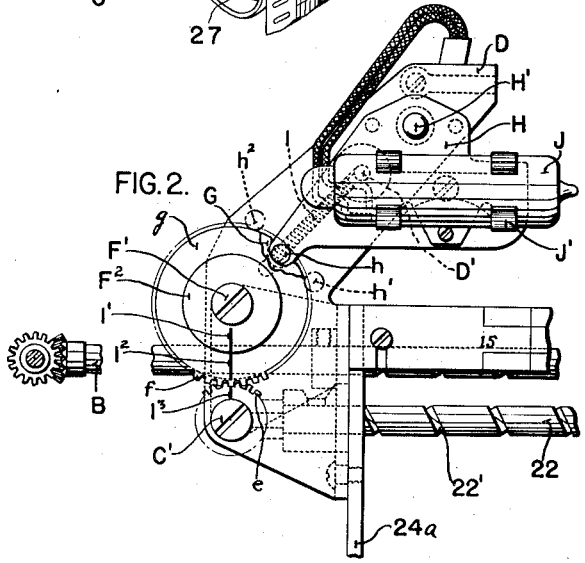
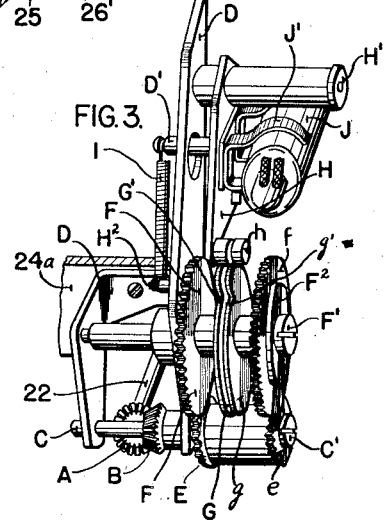
INVENTOR.
COLEMAN B. MOORE
BY George M. Umschough
ATTORNEY Aug. 12, 1941.   C. B. MOORE   2,252,301
CONTROL SWITCH MEANS
Filed May 22, 1937   2 Sheets-Sheet 2
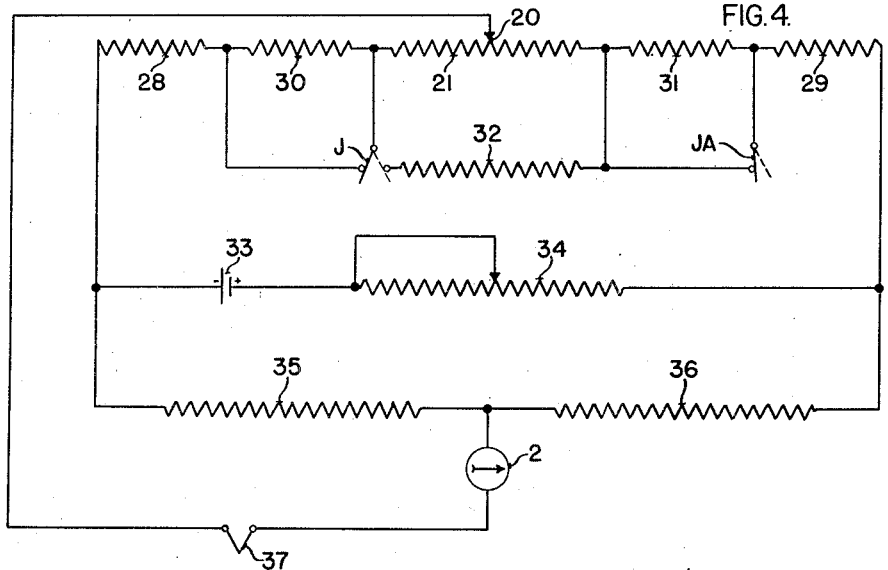
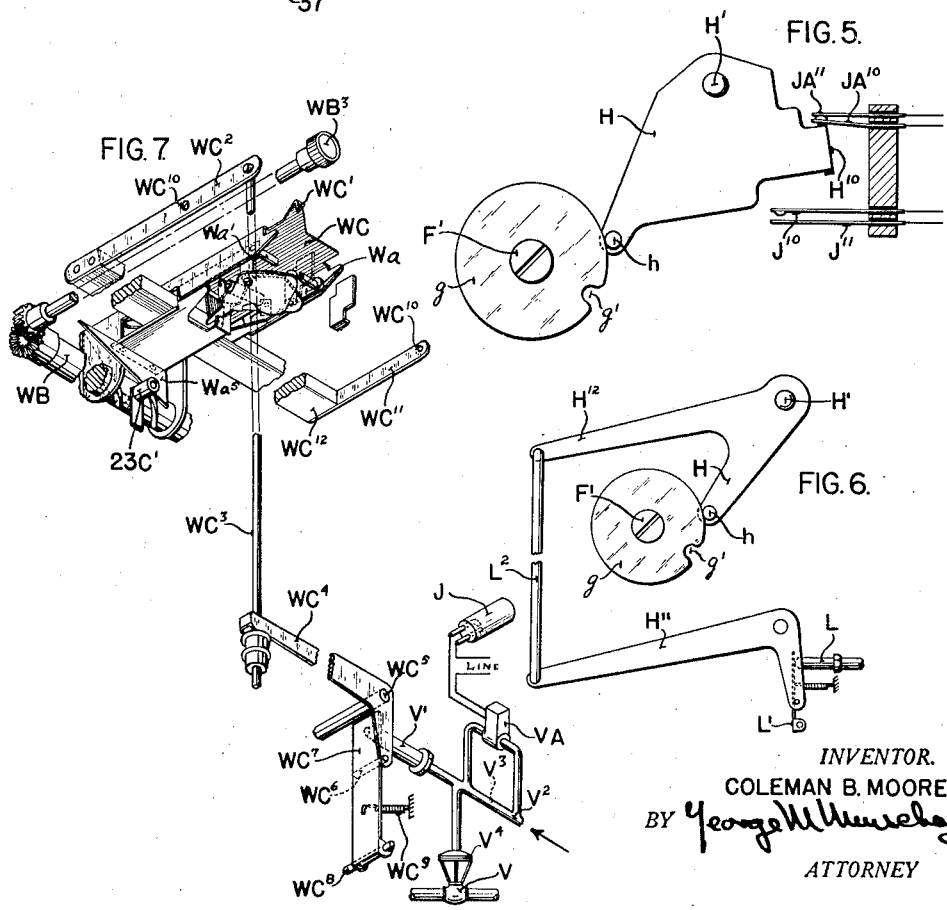
INVENTOR.
COLEMAN B. MOORE
BY George M. Munchany
ATTORNEY Patented Aug. 12, 1941

2,252,301

UNITED STATES PATENT OFFICE 2,252,301

CONTROL SWITCH MEANS

Coleman B. Moore, Carroll Park, Pa., assignor to The Brown Instrument Company, Philadelphia, Pa., a corporation of Pennsylvania Application May 22, 1937, Serial No. 144,320

13 Claims. (Cl. 236—1)

The general object of the present invention is to provide a measuring instrument with novel and effective means of practically desirable form, for producing an alarm or control effect, or for modifying the measuring or control action or capacity of the instrument in a predetermined manner as the value of the quantity measured passes through a certain intermediate value of said quantity.

For example, the invention may be used to operate an alarm or a signal on an excessive variation from normal, of the quantity measured, or to effect an instrument adjustment or safety action on a thermocouple burnout, or on the development of some other defect in the measuring or control apparatus. The invention may be used, in a control instrument to limit the control range of the instrument, or to provide the latter with an additional control point or action. The invention is well adapted for use also in effecting an adjustment of the measuring mechanism or circuit of a measuring instrument so that measurements are made to one scale when the value of the quantity measured is in the portion of its range of variation at the low side of a predetermined intermediate value of the quantity, and are made to a different scale when said value is in the portion of said range at the high side of said intermediate value.

The invention in its preferred form is adapted for actuation by a shaft rotating in one direction or the other on an increase or decrease in the quantity measured, as does a recorder carriage in certain commercial types of measuring instruments. The invention in its preferred form is characterized by its mechanical simplicity and by the ease with which it is possible to adjust and determine the point or portion of the range of variation of the quantity measured at which the invention produces its operative effect.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have illustrated and described preferred embodiments of the present invention.

Of the drawings:

Fig. 1 is a perspective view of self-balancing potentiometer instrument mechanism including a preferred form of the present invention;

Fig. 2 is an elevation of a portion of the apparatus shown in Fig. 1;

Fig. 3 is a perspective view on a larger scale than Fig. 1 of a portion of the apparatus therein shown;

Fig. 4 is a diagram of a potentiometric measuring circuit which may be used in conjunction with the apparatus of Fig. 1, to vary the instrument measuring scale range as the quantity measured passes through an intermediate portion of its range of variation;

Figs. 5 and 6 are somewhat diagrammatic elevations illustrating different modifications of the apparatus shown in Fig. 2; and Fig. 7 is a perspective view of the portion of the apparatus of Fig. 1.

In the form illustrated in Figs. 1 to 3, the invention is incorporated in a potentiometer recording instrument of the commercial type, known as the "Brown potentiometer," and of the particular form disclosed in Harrison et al. Patent 2,150,502, granted March 14, 1939. The said instrument comprises a galvanometer, having a pointer 2 which deflects in response to a condition of unbalance in a potentiometer measuring circuit, such as that shown in Fig. 4, which includes a slide wire resistance 21 and contact 20 which may be adjusted to rebalance the instrument. The instrument also comprises mechanical relay provisions including a constantly rotating power shaft 12', and controlled by the galvanometer pointer 2 deflection from its normal position, for periodically rebalancing the potentiometer circuit, and for moving a recorder carriage 23 along a travelling record strip 26 as required to make record on said strip of the varying value of the quantity measured.

The mechanism of Fig. 1, through which the deflection of the galvanometer pointer 2 controls the adjustments of the recorder carriage 23 and the rebalancing of the potentiometer circuit on a variation in the value of the quantity measured by the galvanometer, comprises a pointer position gauging element 3. The latter is pivotally supported, and in connection with the hereinafter mentioned shaft 6, has a bias which may well be due partly to spring and partly to gravitational action, to turn upward into the position in which one or another of the shoulders 5 of the member 3, engages the pointer 2. The element 3 is engaged by, and turns with the arm 6' of a rock shaft 6. A spring 10 tends to hold a rocker 8 which is journalled on a pivot 9, in the position in which the rocker engages the lateral projection 7' of an arm 7 secured to the shaft 6, and thereby holds the latter in a position in which the shoulders 5 are all below the pointer 2.

A cam 11 which is carried by the constantly rotating power shaft 12', turns the rocker 8 about its pivot against the action of the spring 10, once during each revolution of the shaft. This allows the arm 7 to turn counter-clockwise, as seen in Fig. 1, until the corresponding angular movement of the shaft 6 is interrupted by the engagement of one or another of the shoulders 5 of the member 3 with the galvanometer pointer 2. The shoulders 5 are so arranged that the turning movement of the shaft 6 and arm 7 thus permitted, will be greater or less, according to the deflective position of the pointer 2 at the time. When the arm 7 thus turns counter-clockwise, its lateral projection 7' engages and turns a secondary pointer element 14 into a position corresponding to the then deflection of the pointer 2. The secondary pointer 14 is loosely journalled on the shaft 6, and has a gravitational bias to turn in the clockwise direction as seen in Fig. 1, so that the arm 14 normally bears against the projection 7' of the arm 7.

At the end of each angular adjustment of the secondary pointer 14 into a position corresponding to the then deflection of the galvanometer 2 one or another of high, neutral and low steps or shoulders along the edge 15' of a locking member 15, engages the bottom wall of a slot 14' in the member 14 and thereby frictionally holds the latter in the position occupied by it when such engagement occurs. The locking part 15 is given a tendency to move into locking engagement with the secondary pointer 14 by the spring 10, but is periodically held out of such engagement by the action on a lateral projection from the member 15 of a projection 16A carried by a ratchet lever 16 pivoted at 16B.

The lever 16 has a spring bias to turn forward, in the clockwise direction as seen in Fig. 2, but throughout the major portion of each rotation of the shaft 12', the lever 16 is held in a retracted position by a cam 17 carried by said shaft and engaged by the cam follower roll 16D carried by the lever 16. The ratchet lever 16 is operatively connected to two pawls 16E and 16F cooperating with a toothed wheel 18. Each of said pawls is biased for movement into a position in which it does not engage the teeth of the wheel 18, but one or the other of the pawls is brought into engagement with the teeth of the wheel 18, on each forward or clockwise movement of the lever 16, by the locking part 15, if the latter is then at one side or the other of its intermediate or neutral position, occupied when the galvanometer pointer 2 is in its neutral position.

The position assumed by the part 15 when in locking engagement with the secondary pointer 14, controls the action of the pawls 16E and 16F by virtue of the fact that the part 15 carries a pawl engaging spring arm $15^{11}$. The movement of the locking part 15 into the position in which its high shoulder of its edge 15' engages the secondary pointer 14, causes the arm $15^{11}$ to move the pawl 16E into operative engagement with the teeth of the ratchet wheel 18, and the clockwise or forward movement of the ratchet lever 16 then gives a clockwise adjustment to the ratchet wheel. Conversely, when the part 15 moves into the position in which its low shoulder of edge 15' engages the secondary pointer 14, the arm $15^{11}$ shifts the pawl 16F into operative engagement with the wheel 18, and the latter is then adjusted in the counter-clockwise direction.

The extent of the adjustment then given the wheel 18 is made dependent upon the position of the secondary pointer 14, as said position determines which of the various shoulders of an arm 16G carried by the lever 16 shall then engage a projecting portion $14^{11}$ of the secondary pointer 14 and thereby arrest the forward movement of the ratchet lever 16, after an extent of forward movement varying with the shoulder engaged. In the neutral position of the galvanometer pointer and secondary pointer 14, the projection $14^{11}$ of the latter engages the central shoulder 16G' of the arm 16G and the lever 16 is then held against any operative movement in the clockwise direction. When the secondary pointer position is more or less to one side or the other of its neutral positions, the portion $14^{11}$ engages an upper or lower shoulder of arm 16G more or less distant from the central shoulder 16G', and the lever 16 is then permitted more or less forward movement.

The rotation of the wheel 18 in one direction or the other, effects corresponding potentiometer rebalancing adjustments, and corresponding position adjustments of the recorder carrier 23. The rebalancing adjustments are effected by means of a rheostat shaft 19 which is geared to the shaft 18' on which the wheel 18 is secured. The rotation of the shaft 19 moves a bridging contact 20 along the convolutions 21 of a potentiometer slide resistance helically disposed about the axis of the shaft 19, and thereby varies the amount of said resistance in the potentiometer circuit. The resistance adjustments made in response to a deflection of the galvanometer pointer in either direction away from its neutral position rebalances, or tends to rebalance, the potentiometer circuit and thereby returns, or tends to return, the galvanometer pointer to its neutral position.

The rotation of the wheel 18 adjusts the recorder carrier 23 by virtue of the fact that the teeth of the wheel 18 are in mesh with the teeth of a gear carried by a carriage adjusting shaft 22. The latter is formed with a thread groove 22' of coarse pitch, which receives a cam or mutilated screw thread rib (not shown) secured to the carriage 23, so that the latter is moved longitudinally of the shaft 22 as the latter is rotated.

The marker carriage 23 comprises a sheet metal frame portion, cut and shaped to provide bearing and movement guiding parts including two apertured ears 23a through which the shaft 22 extends, and projections 23b, which bear against the inner edge and upper side of the lower flange of a channel bar or rail 24 forming part of the instrument framework. In addition the carriage is provided with a forwardly extending tongue passing beneath the rail 24 and terminating in an uprising pointer or index 23d adapted to cooperate with a scale marked on the front face of the rail 24 to indicate the position of the carriage 23, and thereby the value of the quantity measured and recorded by the instrument. The record sheet 26 passes over and is given feeding or advancing movements by a record feed roll 27. The latter is intermittently rotated by means of a worm and screw connection between the shaft of the roll 27 and a transverse shaft 28, and connection including a ratchet and lever (not shown) between the shafts 28 and 12.

The measuring apparatus just described may be employed to effect selective control actions in accordance with the position of the carriage 23 relative to a control carriage WC in the manner contemplated in Patent No. 2,093,119, granted September 4, 1937, on my copending application Serial Number 104,779, filed October 9, 1936. So employed the device is adapted to adjust a fuel or like valve V (Fig. 7) which may directly or indirectly control a condition to which the galvanometer 1 is responsive. The control carriage WC is adjustable longitudinally of the scale 24 by means of the spiral shaft WB which may be rotated by means of the knob WB³ which is gear connected to shaft WB, the index WC¹ indicating on the scale 24 the desired value of the condition controlled.

The means through which the carriage 23 controls the valve V includes a roller 23C' carried by the carriage 23 which cooperates with a cam member Wa⁵ of a control member Wa pivoted to the control carriage WC at Wa'. The oscillatory movements of the member Wa⁵ about Wa' resulting from deflection of the carriage 23 back and forth beneath the cam Wa⁵ impart movement to a control bar WC¹² which is carried by a pair of arms WC¹¹ and WC² disposed at opposite ends of the instrument framework and pivoted thereto at WC¹⁰ respectively. The arm WC² is connected by means of a link WC³ to a bell crank lever WC⁴ pivoted to the instrument framework at WC⁵. Bell crank WC⁴ is provided with a pin WC⁶ adapted to engage a flapper WC⁷ which is pivoted at WC⁸ and urged in the clockwise direction about the latter by means of a spring WC⁹, to thereby govern the approach and recession of the flapper WC⁷ with respect to cooperating nozzle V'. The nozzle V' is supplied with air through a supply conduit V² having a restriction V³ and is formed with a port adapted to be throttled by the flapper member WC⁷. The conduit V² also communicates with the pressure chamber V⁴ of the valve V whereby the relative positions of flapper WC⁷ and nozzle V' govern the pressure in the valve pressure chamber thereby controlling the admission of a corrective medium through the valve in a well known manner. The control of valve V effected by the mechanism of Fig. 7 is of the throttling variety but may well be of other and well known forms which need not be described herein.

With a wide throttling range adjustment of the air controller of Fig. 7, that is to say with an adjustment such that a relatively wide deflection of pen carriage 23 results in a comparatively small adjustment of valve V, the condition represented by the movement of the pen 23 may deviate widely from its intended value without effecting complete closure or opening of valve V. In some instances it is desired to fully close down the system upon a pen carriage deviation of predetermined extent even though that deviation would not close off the valve in the normal proportional adjustment of the valve by the pen carriage. To this end I employ the electrical switching mechanism of Figs. 1–3 or Fig. 5 to actuate a valve VA shown as controlling a by-pass about restriction V³ and adapted when open to impress full line pressure upon valve V irrespective of the position of flapper WC⁷. Valve VA is opened under control of switch J when pen carriage 23 reaches a predetermined point on scale 24. Valve VA need not necessarily control a by-pass as shown to perform its intended function but may independently control the valve V in other ways as for example, by the control of an auxiliary leak port or separate fluid pressure supply.

In respect to the instrument features already specifically referred to, the instrument mechanism shown in Fig. 1, includes nothing claimed as novel herein, but on the contrary is merely one example of an existing instrument in which use of my present invention may be made with advantage.

For the purposes of the present invention, the pen, or recorder carriage, shaft 22 is provided at one end with a beveled gear A in mesh with a bevel gear B carried by a shaft C mounted in a supporting structure D attached to an end plate 24a of the instrument framework. The shaft C carries two spur gears E and e, each of which, advantageously and as shown, is rigidly connected to a sleeve or common hub portion which surrounds and is in frictional engagement with the shaft C, so as to normally rotate with the latter. The gears E and e are in mesh with spur gears F and f, respectively, each of the latter being carried by a supporting shaft F'. Between the two gears, F and f, are two side by side disks G and g coaxial with and connected to the gears F and f, respectively, to turn with the latter, as by mounting each disk on a hub portion of the corresponding gear. For adjustment purposes, it is convenient to rigidly secure the gear E and disc F to the shaft F', and to journal the gear e on said shaft and hold it against longitudinal movement of the shaft by a washer or collar F² secured to the front end of the shaft F'.

The disks G and g are formed with peripheral notches G' and g', respectively, which may be moved into and out of register with one another by rotative movements of the shaft 22. As shown in Fig. 1, the notches G' and g' are in register when the recorder carriage 23 is in the intermediate portion of its range of movement in which the record formed by the pen 25 is confined to the narrow portion 26' of the record strip 26. As the rotation of the shaft 22 in either direction moves the carriage 23 away from its intermediate portion of its range of movement, the notches G' and g' are moved out of registration with one another, as a result of the fact that the gear ratio of the gears E and F is different from that of the gears e and f. The difference in the gear ratios may vary with conditions of use as hereinafter described, but normally is slight. By way of illustration the gear ratio may be 2 to 1 between gears F and E and those gears may have respectively 60 and 30 teeth, while gears f and e respectively have 39 and 21 teeth. With this arrangement and with a full scale travel of pen 23 equivalent to 26 revolutions of shaft 22 the disc G will make 13 turns as the dic g makes 14 turns thereby bringing the disc notches into registry once only during the full scale travel of the pen.

In the construction illustrated, the relative angular positions of the disc notches G' and g' determine the angular adjustment of a controlling element H. The latter is pivotally connected at H' to the support D, to turn about an axis parallel to the axis of the shaft F'.

The member H is provided with a transversely extending pin $h$, which extends across the planes of the disks G and $g$, and bears against the periphery of one or both of the two disks, except when their angular positions are such that pin $h$ is received in the notches G' and $g'$. The pin $h$ is caused to bear against the peripheral edges of the disks or to move into the notches G' and $g'$, when the positions of the latter permit such movement, by a bias force due, as shown, to spring I. The latter acts between a stationary spring support $H^2$ and a lateral extension D' from the member H. The parts D' and $H^2$ are so located that the spring I has its axis in or near to the plane including the axes of the shafts H', and F', when the relative position of the parts are such that the axis of the pin $h$ is in said plane. The spring I is thus adapted to cause the pin $h$ to move into the notches G' and $g'$ as shown in Fig. 2, as the disks G and $g$ are turned into their positions shown in that figure by turning movement in either direction. Conversely, the spring yields to permit the pin $h$ to be moved out of the notches G' and $g'$, and into one or the other of its dotted line positions $h'$ and $h^2$ shown in Fig. 2, by rotation of the disks, G and $g$, clockwise or counterclockwise, respectively, from their positions shown in Fig. 2.

Sufficient movement of the carriage 23 away from the position shown in Fig. 1 in either direction, will bring the notches G' and $g'$ into register at the end of a movement of the slower of the two disks through an arc which is less than 360° by an amount depending on the relative angular velocities of the two disks. On such registration of the two notches, the latter are angularly displaced from and cannot be entered by the pin $h$. On each complete turn of either disk G or $g$, its notch, G' or $g'$, respectively, is moved through the position in which it would be entered by a pin $h$, if the latter were not then held out of the notch by the other disk. The action by which the pin $h$ is moved between its dotted line position $h'$ and $h^2$ shown in Fig. 2 is essentially a Geneva-gear action, and would be effected in substantially the same way by either of the two disks if the other were eliminated.

As will be apparent, the extent of movement of the recorder carriage 23 longitudinally of the shaft 22, required for the movement of the pin $h$ between its dotted line positions $h'$ and $h^2$ of Fig. 2, may depend somewhat upon the width and shape of the side of the notches G' and $g'$, but depends primarily on the relative angular velocities of the shaft 22 and disks G and $g$, and the pitch of the helical groove 22'. The angular velocity, and groove pitch of shaft 22 must be determined, ordinarily, without taking the present invention into account, but the pitch diameters of the gears A, B, E and F may be selected to give the particular relative angular speeds of the shaft 22, C and F', which the use of the present invention makes desirable. In the form of the invention shown in Figs. 1, 2, and 3, it has been found practical to move the pin $h$ between its dotted line positions $h'$ and $h^2$ by a rotative movement of the shaft 22 sufficient to give a longitudinal movement to the recorder carriage 23 of $\frac{1}{32}$" only. The considerable magnitude of movement of the pin $h$ between its positions $h'$ and $h^2$, relative to the magnitude of the corresponding movement of the carriage 23, explains, and the form of apparatus described is made practically possible by, the use of the two notched disks G and $g$ moving at slightly different angular velocities. For the desired movement relation and the avoidance of undesirably large disk diameters, it is practically essential that each disk should make more than one complete revolution as the carriage 23 is moving from its mid position to either end position, and if either disk were used alone, or if the two disks were given the same angular velocity, the pin $h$ would not be operatively engaged by the carriage 23 at other times than when moving through its mid position.

The frictional connection between the shaft C and the common hub, or connecting sleeve, for the gears E and $e$, permits of a quick and easy adjustment of the apparatus, to vary the value of the quantity measured, and the position of the recorder carriage along its longitudinal path of movement at which the pin $h$, will enter the notches $g'$ and G'. Such an adjustment may be readily effected by first rotating the shaft C, and thereby the gears E, $e$, F, and $f$ until the two disks G and $g$ are brought into their positions shown in Figs. 1 and 2, and by thereafter rotating the shaft C, while holding the front gear $f$ stationary, until the index 23$d$ on the carriage 23 registers with the scale mark on the rail 24 indicating the value of the quantity measured at which it is desired to have the pin $h$ fully entered in the notches G' and $g'$. To facilitate the operations described, the shaft C is formed with a kerf C' at its front end, to receive the blade of a screw driver $b$ by which the shaft may be rotated. As shown, the washer or collar $F^a$, which rotates with the shaft F', the gear $f$, and the gear $e$ are formed with radial marks I', $I^2$, and $I^3$, respectively, which are brought into alignment when the notches G' and $g'$ are in position to receive the pin $h$, as shown in Fig. 2.

The device directly actuated by the angular adjustments of the member H effected as the pin $h$ is moved between its dotted line positions $h'$ and $h^2$ may take various forms, but ordinarily will be an electric switching mechanism, a valve mechanism, or a mechanical signal or alarm actuating mechanism. In any case it will be noted that the device is securely locked in its adjusted position against accidental or other manual movement. As shown in Figs. 1, 2, and 3, the device is shown as a single mercury switch J having its glass container held by spring clips J' carried by the member H. The switch J may be of conventional type, and of a form which may vary in accordance with its intended purpose. Thus, for example, the switch J may serve simply to open or close a single electric circuit, accordingly as the member H is moved into one or the other of its two end positions. Alternately, the switch J may be a two-pole switch, opening one and closing the other of two circuits as it moves into one of its two positions, and closing the one and opening the other of said two circuits as it moves into its second position. The switching mechanism carried by the member H may also comprise a plurality of switches, such as the two switches J and JA included in the circuit arrangement shown in Fig. 4.

In Fig. 4, I have illustrated a potentiometric measuring circuit including the previously mentioned slide wire resistance 21 which may be used with the apparatus shown in Figs. 1, 2, and 3, for the purposes of the present invention. The circuit shown in Fig. 4 is a so-called split potentiometer circuit, comprising three branches and of conventional type except in respect to resistances and switching means associated with the circuit branch including the slide wire resistance 21. The circuit branch including the resistance 21 comprises end resistances 28 and 29, intermediate resistances 30 and 31, a slide wire shunting resistance 32, and instrument actuated switches J and JA. A second branch of the potentiometer circuit includes a battery 33 for energizing the circuit and the usual regulable resistance 34. The third branch of the potentiometer circuit includes resistances 35 and 36. The instrument galvanometer 2 has one terminal connected to the common junction of the resistances 35 and 36, and has its other terminal connected to the slide wire engaging contact 20, in series with a thermocouple or other source 37 of voltage to be measured.

In Fig. 4, the full line positions of the two switches J and JA correspond to the position of the member H, in which its pin $h$ occupies the dotted line position $h^2$ of Fig. 2. The dotted line positions of the switches J and JA of Fig. 4 corresponds to the position of the member H, in which its pin $h$ occupies the dotted line position $h'$ of Fig. 2. The switches J and JA thus occupy their full line positions when the instrument is operating in a lower portion of its scale range and occupy their dotted line positions when the instrument is operating in an upper portion of its scale range. In their full line positions, the switch J closes a shunt of negligible resistance about the resistance 30, and the switch JA closes a similar shunt about the resistance 31. Each of those short circuiting shunt circuits is opened when the switches J and JA move into their dotted line positions, and in its dotted line position the switch J connects the resistance 32 in parallel with the slide wire resistance 21. In the full line positions of the switches J and JA, the resistance 32 is open circuited.

The switches J and JA are adjusted from their full line into their dotted line positions, or from the latter positions into their full line positions, as the value of the quantity measured increases above or decreases below a certain intermediate value for which the apparatus is calibrated. In many cases, said intermediate value may well be that corresponding to the midscale position of the recording device 23, and to the position of the slide wire contact 20 midway between the ends of the slide wire resistance 21. It is practically desirable that the total resistance of the measuring circuit branch including the slide wire resistance 21 should not be changed by the adjustments of the switches J and JA between their full and dotted line positions. It is desirable and practically important also, that at the said intermediate value of the quantity, the measuring circuit balancing position of the contact 20 is the same, whether the switches J and JA are in their full line, or are in their dotted line positions. For such balancing of the circuit with the switches in either position, it is essential that when the switches J and JA are in their full line positions, the sum of potential drops in the resistance 28 and in the portion of the resistance 21 at the left of the contact 20, as seen in Fig. 4, should be equal to the sum of the potential drop in the resistance 28, the potential drop in the resistance 30 and the potential drop in the portion of the resistance 21 at the left of the contact 20, when the switches J and JA are in their dotted line positions.

Those skilled in the art will understand how to proportion the various resistances to secure the results above described. Merely by way of example and illustration, we note that those results can be secured in measuring a thermocouple temperature varying between zero and 1200°, if the potential of the battery 33 is 1½ volts, and the voltage of the thermocouple, expressed in millivolts, is —0.922 at a temperature of 0° F., and is 29.54 at a temperature of 1000° F., and is 36.04 at a temperature of 1200° F., and if the resistances 21, 28, 29, 30, 31, 32, 34, 35, and 36 have respective ohmic values as follows: 40, 7.35, 677, 15.75, 15.75, 10.8, 110, 6.025, and 509.5.

With the circuit values mentioned above, the thermocouple temperatures between 0° F. and 1000° F., will be recorded on the chart portion at the left of an intermediate chart portion, and when the temperature of the thermocouple varies between one thousand and twelve hundred degrees F., the record traced will be traced on the portion of the chart at the right of the strip 26'. Furthermore, the chart portions at the left and right of the strip 26' will be of the same width, and the pen movement per degree difference in thermocouple voltage, will be five times as great when the thermocouple voltage, is in the 1000°–1200° range as when it is in the 0–1000° portion of its range of variation. The open scale measurement of temperature with the 1000°–1200° range will be especially suitable in a case in which the temperature measured is normally within that range or in which accuracy of measurement in that range is especially important.

As will be apparent, the width of the chart portion 26' corresponds to such variation in the thermocouple temperature between a temperature slightly below 1000° and a temperature slightly above 1000°, as is required for the movement of the carriage 23 necessary to adjust the pin $h$ between its dotted positions, $h'$ and $h^2$. While the thermocouple temperature is within this intermediate instrument adjusting zone or range, the instrument does not give a true record of the thermocouple temperature, but by suitably proportioning the apparatus, the width of the chart portion 26' may be made narrow, so that the failure to make an accurate record of the temperature between the limits corresponding to the scale positions of the side edges of the portion 26', is practically unimportant. This is particularly true, if the temperature measured is normally within, or has its critical portion within the portion of its range at one side or the other of the portion recorded on record strip 26'. Moreover, when the apparatus is used in connection with a process normally carried out at a constant temperature, the chart portion 26' will correspond to temperatures of the thermocouple prevailing for brief and infrequent periods only.

In Fig. 5, I have illustrated a modification of the apparatus shown in Figs. 1, 2, and 3, in which the member H carries a switch actuating projection $H^{10}$. When the member H is in one of its two operating positions, the part $H^{10}$ engages a spring contact $J^{10}$ and presses it into engagement with a cooperating contact $J^{11}$, to thereby close one circuit which is opened by movement of the member H into its second position. In the last mentioned position, the projection $H^{10}$ engages a spring contact $JA^{10}$ and forces the latter into engagement with a cooperating contact $JA^{11}$ to thereby close a second circuit, which is opened by movement of the member $H^{10}$ back into its position of engagement with the contact $J^{10}$. The circuits energized by the engagement of contacts $J^{10}$ and $J^{11}$, and contacts $JA^{10}$ and $JA^{11}$, may serve like those controlled by the switches J and JA of Fig. 4, to give different scale values to the deflections of the carriage 23 occurring in different sections of its range of deflection and may also serve to actuate signalling means.

In the modification shown in Fig. 6, the member H is employed to give an opening or a closing adjustment to a control valve L, as the variations in the value of the quantity measured result in a movement of the member H in one direction or the other between its two end positions. As shown in Fig. 6, the flapper L' of the valve L is actuated by bell crank H¹¹ connected by a link L² to an arm H¹² carried by the member H. The valve L may be employed for various purposes, such as to totally cut off the supply of fuel to a furnace when its temperature rises above the intermediate value and thus adjusts the member H, in the clockwise direction.

Although I have illustrated the switching mechanism of my invention as adapted to be controlled by the shaft 22, it will be understood that it may equally well be applied to control from the shaft C. The latter adaptation is necessary or desirable when an instrument of the sort illustrated in Figs. 1 and 7 is controlled from a remote point by a second equivalent instrument in which a reversible motor may be arranged to drive the shaft B thereby automatically raising or lowering the control point of the instrument. With the shaft B of the first instrument controlled by a second instrument it is desirable that the latter should not be permitted to raise the control point of the first instrument beyond a predetermined point. Thus the switch actuating mechanism including switch J may be actuated by shaft B instead of shaft 22 and the switch may be arranged to prevent movement of shaft B beyond a predetermined point as by a de-energization of the said reversible motor or other driving means for the shaft B. Use of this application of my invention may be made in time-cycle control in which the shaft B is driven in one direction or the other by direct connection to a reversible motor when it is desired to change the control point in a predetermined manner with respect to time. Such control effects for adjusting the shaft B may for the purposes of my present invention be considered as variable quantities.

While the switch actuating mechanism devised by me, and disclosed and obtained herein, finds an important field of use in changing the measuring scales of measuring instruments, it was not devised primarily for such use, and I do not claim as my invention the generic combination disclosed herein of the said switch actuating mechanism with measuring instrument elements cooperating to change the instrument measuring scale when the switch mechanism is operated. That combination is disclosed and generically claimed, however, in the application of Anker E. Krogh, and Joseph P. Vollrath, Serial Number 144,288, filed of even date herewith.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent, is:

1. The combination with mechanism for measuring a quantity varying between upper and lower values, of means for producing an effect on the attainment of said quantity of a value intermediate the first mentioned values, said means comprising a pair of notched coaxial discs, and means through which said mechanism angularly adjusts said members at different angular speeds on a change in said quantity in one direction or the other, dependent on the direction of said change, said notches being brought into register by the movements of said discs into the angular positions assumed by them on the attainment of said intermediate value, and a device adapted to be moved into and out of said notches as said discs move through said positions.

2. The combination with mechanism for measuring a quantity varying between upper and lower values, of means for producing an effect on the attainment by said quantity of a value intermediate the first mentioned value, said means comprising a pair of notched coaxial discs, means through which said mechanism angularly adjusts said members at different angular speeds on a change in said quantity in one direction or the other, dependent on the direction of said change, said notches being brought into register by the movements of said discs into the angular positions assumed by them on the attainment of said intermediate value, and a device adapted to be moved into and out of said notches as said discs move through said positions, and means for angularly adjusting one of said discs relative to the other to thereby alter said intermediate value.

3. The combination with mechanism for measuring a quantity varying between upper and lower values, of means for producing a mechanism adjustment effect on the attainment by said quantity of a value intermediate the first mentioned values, said means comprising a pair of coaxial discs, each formed with a peripheral notch, and means through which said mechanism angularly adjusts said members at different angular speeds on a change in said quantity in one direction or the other, dependent on the direction of said change, said notches being brought into register by the movements of said discs into the angular positions assumed by them on the attainment of said intermediate value, and a device adapted to be moved into and out of said notches as said discs move through said positions.

4. The combination with mechanism for measuring a quantity varying between upper and lower values, of means for producing an effect on the attainment by said quantity of a value intermediate the first mentioned values, said means comprising a pair of coaxial discs each formed with a peripheral notch, means through which said mechanism angularly adjusts said members at different angular speeds about a common axis on a change in said quantity in one direction or the other, dependent on the direction of said change, said notches being brought into register by the movements of said discs into the angular positions assumed by them on the attainment of said intermediate value, and a part adapted to be moved into, and with, and out of said notches as said discs move through said position.

5. In a measuring instrument, the combination with measuring means including a rotatable shaft and means for rotating said shaft in selective accordance with the direction and magnitude of changes in the quantity measured, of a pair of angularly adjustable notched discs arranged side by side, connections between said discs and shaft through which a rotative movement of the latter gives rotary movements in the same direction but at different speeds to the said two discs and which when said quantity attains a predetermined value, moves said discs into particular angular positions, and an element biased for movement into said notches when said discs move into said positions, and move out of said notches by movement of said discs out of said position.

6. In a measuring instrument, the combination with measuring means including a rotatable shaft and means for rotating said shaft in selective accordance with the direction and magnitude of change in the quantity measured, of a pair of angularly adjustable discs, arranged side by side, and each formed with a notch, connections between said discs and shaft through which the rotation of the latter gives rotary movements in the same direction but at different speed to the two discs and which are adapted to give particular angular settings to said discs when said quantity attains a predetermined value, the notch of each disc being in register with the notch of the other disc, when said discs have said settings and means comprising an element pivoted to turn about a fixed axis laterally displaced from the common axis of said discs and including a portion adapted to enter the said notches when the latter are in register whereby said discs and member than coact as driving and driven Geneva-gear elements.

7. In a measuring instrument, the combination with measuring means including a rotatable shaft and means for rotating said shaft in selective accordance with the direction and magnitude of change in the quantity measured, a pair of angularly adjustable discs, arranged by side by side, and each formed with a notch, connections between said discs and shaft through which the rotation of the latter gives rotary movements in the same direction but at different speeds to the two discs, and thereby giving said discs predetermined angular settings when said quantity attains a predetermined value, and means comprising an element pivoted to turn about a fixed axis laterally displaced from the common axis of said discs, and adapted to enter the said notches when said discs have their said predetermined angular settings.

8. The combination with mechanism for measuring a quantity varying between upper and lower values of means for producing an effect on the attainment by said quantity of a value intermediate the first mentioned values, said means comprising two discs equal in diameter and concentric with and revolvable about the same axis, and each formed with a peripheral notch, means through which said mechanism angularly adjusts said members about said axis at different angular speeds on a change in said quantity in one direction or the other, depending on the direction of said change, a member pivoted to turn about an axis parallel to the first mentioned axis and separated therefrom by a distance greater than the radial extent of said discs, and having a portion normally engaging the periphery of one or of each of said discs, at one side or the other of the plane of said axes and adapted to enter the notches in said discs and to be thereby moved through said plane when said quantity varies through a range such that the disc notches move in register from one side to the other in said plane.

9. In a measuring instrument, the combination with a threaded shaft and means for rotating said shaft in a direction and to an extent selectively dependent on the direction and magnitude of change in a quantity measured, a carriage in threaded engagement with, and moved longitudinally of said shaft by the rotation of the latter, a pair of coaxial rotatable discs of similar diameters and each formed with a peripheral notch, a connection between each disc and said shaft whereby each rotative movement of the latter gives rotating movements to the two discs in the same direction but at different angular speeds, and means for producing a regulatory effect on the attainment by the quantity measured of a value corresponding to an intermediate position of said carriage, comprising a member adapted to move into each of said notches when the latter are adjusted into predetermined angular positions.

10. In a measuring instrument, the combination with a threaded shaft and means for rotating said shaft, in a direction and to an extent selectively dependent on the direction and magnitude of change in a quantity measured, a carriage in threaded engagement with, and movable longitudinally of said shaft, by the rotation of the latter, a pair of coaxial rotatable discs of similar diameters and each formed with a peripheral notch, a connection between each disc and said shaft whereby each rotative movement of the latter gives rotating movements to the two discs in the same direction, but at different angular speeds, means for producing a regulatory effect on the attainment by the quantity measured of a value corresponding to an intermediate position of said carriage, comprising a member adapted to move into each of said notches when the latter are adjusted into predetermined angular positions, and means for relatively adjusting said connections to thereby vary the intermediate value of the quantity measured at which said notches assume said intermediate positions.

11. Control apparatus including a condition responsive device, a movable exhibiting carriage, a rotatable shaft adapted to deflect said carriage along a scale under control of said device, a nozzle supplied with air under pressure, a cooperating valve member governing said pressure, a control motor responsive to said pressure, a cam operated by said carriage to adjust said member, a rotary element carrying a mercury switch, safety means operated by said switch to control said condition, and means interposed between said shaft and element to operate the latter on movement of said carriage through a predetermined small portion of its range of deflection.

12. In a control system, a condition responsive device, means controlling said condition including a nozzle supplied with air under pressure, a cooperating valve member for governing said pressure, a control motor responsive to said pressure, a mercury switch and safety means operated by said switch to control said condition, and means controlled by said device to adjust said member in accordance with the variations of said condition and adapted to actuate said switch upon the variation of said condition through a predetermined small portion of its range of variation.

13. In a control system, a condition responsive device deflecting through a range of movement, means controlling said condition including a nozzle supplied with air under pressure, a cooperating valve member for governing said pressure, a control motor responsive to said pressure, a mercury switch and safety means operated by said switch to control said condition, means connecting said device and member for adjustment of the latter under the control and in accordance with the deflection of said device through said range, and means connecting said device and mercury switch for adjustment of the latter on the deflection of the device through a small portion of said range.

COLEMAN B. MOORE.